Patented June 14, 1949

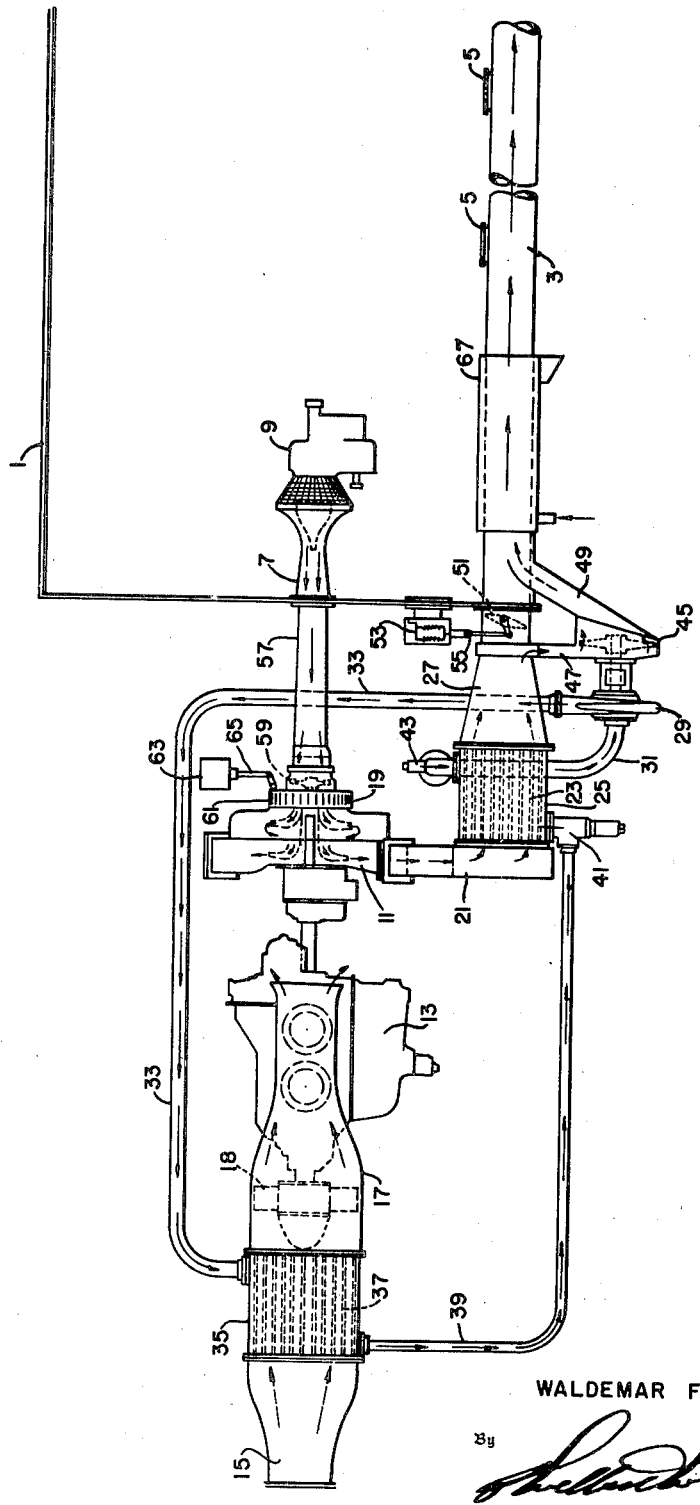

2,473,496

UNITED STATES PATENT OFFICE 2,473,496

AIR CONDITIONING SYSTEM

Waldemar F. Mayer, Los Angeles, Calif., assignor to The Garrett Corporation, Los Angeles, Calif., a corporation of California Application October 11, 1944, Serial No. 558,148

17 Claims. (Cl. 257—3)

This invention relates to air conditioning systems for regulating the temperature of air delivered under pressure into an enclosure such as an aircraft cabin.

It is necessary to replenish the air in an aircraft cabin to replace oxygen consumed by cabin occupants. For higher altitude flying, it is also necessary to maintain, above a range of altitudes, such as, for example, 8000', a pressure in the cabin higher than that of the ambient atmosphere. It is customary to employ a rammed air intake for scooping up the air met with by the plane in flight, and, for higher altitude flying, to employ supercharging means for increasing the pressure of the air delivered into the cabin. The work done by the ramming means in accelerating the air to cabin velocity, and the compressing action of the supercharger, heats the air to such an extent as to raise the temperature of the cabin to an uncomfortable level when the ambient air has a fairly high existing temperature.

An object of the invention is to provide an air conditioning system which is adapted with maximum efficiency to cool the air being forced into the cabin. More specifically, it is an object of the invention to provide an arrangement wherein a refrigerant for cooling the air is forcibly circulated by a compressor which is driven by a motor which in turn is driven by the air being forced under pressure into the cabin, and, in so being driven, abstracts heat from the air.

A further object of the invention is to provide in such a system an arrangement whereby this air driven work absorbing means may be taken out of the pressurized stream of the air when the temperature of the air in the cabin drops below the point at which it is desirable to cool the air. To this end, the invention contemplates the arrangement of the air driven turbine in a valve controlled bypass. The invention further contemplates the employment of automatic means, responding to the cabin temperature, for controlling the valve.

A further object of the invention is to provide, in an air conditioning system of the character indicated, means for abstracting the energy from the air outflowing from the cabin under pressure, and converting this energy to useful work. To this end, the invention contemplates an arrangement wherein a supercharger for compressing the air delivered to the cabin is driven partially by an independent source of power and partially by a recovery air turbine driven from the outlet air.

A further object of the invention is to provide, in an air conditioning system embodying refrigerating means, an arrangement wherein the air which is passed through the refrigerant condenser from a rammed air inlet is delivered to the internal combustion engine which drives the supercharger in order to warm the same when cold, and cool the same when hot.

Another object of the invention is to provide a system of the type indicated which is adapted to be correlated with a cabin pressure regulator outlet valve for controlling the pressure in the cabin at a higher level than ambient atmosperic pressure.

A further object of the invention is to provide an optimum combination of features meeting contradictory requirements, such as: light weight, low power consumption (saving of fuel), reliability, and simplicity.

Another object is to provide an air conditioning system capable of maintaining 70° F. cabin temperature while changing the air within the cabin at least once in every two minutes.

A further object of the invention is to provide an aircraft cabin air conditioning system which utilizes the heating effect of the compression of the air in the supercharger to normally heat the cabin air, but which is provided with an auxiliary combustion or exhaust gas heater adapted to be utilized only when the heat of compression is inadequate to meet the heating requirements.

Further objects and advantages of the invention will be brought out in the following part of the specification.

The drawing shows a schematic layout of an aircraft cabin air conditioning system embodying the invention.

As an illustrative embodiment of the invention, I have shown in the drawing an air conditioning system for pressurizing and conditioning and circulating a body of air through an aircraft cabin which is indicated schematically at 1. The air is delivered into the cabin through an air supply duct 3, having a number of outlets 5, from which the air may escape into the cabin. The air is discharged from the cabin through an outlet 7 having a pressure regulating valve 9 connected thereto. The valve 9 may incorporate the features of construction and operation illustrated in the Reissue Patent No. 22,272, issued February 16, 1943, to N. C. Price, for Pressure control system for aircraft cabins.

The duct 3 receives air under pressure from a supercharger 11 which is driven by an internal combustion engine 13. The power required to supply the large volume of air to change the air in the cabin once every two minutes, under a pressure which is equivalent, at 20,000' altitude, to ambient pressure existing at 8000' altitude, is considerably greater than the power which can be taken off of the engines of existing aircraft. Accordingly, the engine 13 is an auxiliary engine, functioning solely to drive the mechanism of the air conditioning system.

The engine 13 and the supercharger 11 are located in a compartment of the aircraft which is external of the cabin 1, preferably forwardly thereof. Air is delivered into this space through a rammed air inlet 15 from which the air passes to a jacket 17 which directs it over the engine 13.

The ambient atmospheric air is driven through the jacket 17 by a fan 18 which is mounted on the shaft of the engine 13. The fan 18 supplements the action of the rammed air inlet when the aircraft is in flight and serves as the sole means for circulating cooling air against the engine when the aircraft is being maneuvered or kept on the ground. After passing over the engine 13, in heat exchange relation therewith, the air passes to the inlet 19 of the supercharger, through which it enters the supercharger.

From the outlet of the supercharger, the air passes through an elbow 21 into the air passages 23 of an evaporator 25, forming part of the refrigerating circuit. From the air passages 23, the air travels through a connecting duct 27 into the duct 3.

The refrigeration mechanism includes a compressor 29 adapted to compress a refrigerant, such as Freon gas, received from the evaporator 25 through the suction line 31 and to deliver the compressed refrigerant through the high pressure line 33 into the refrigerant spaces of a condenser 35. The condenser 35 is interposed between the rammed air inlet 15 and the jacket 17, and has a plurality of air passages 37 through which the air may pass from the inlet 15 to the jacket 17 in heat exchange relation with the refrigerant in the space surrounding said passages. The refrigerant is thus relieved of the heat of compression and is condensed into liquid form and returned to the evaporator 25 through the suction tube 39 and expansion valve 41. Constant evaporative pressure is maintained by means of a refrigeration pressure regulator 43. The vapor temperature is determined by the setting of the regulator pressure.

The evaporator 25 is interposed between the supercharger exhaust elbow 21 and the cabin air supply duct connection 27, so that the air from the elbow 21 may pass through the air passages 23 into the connection 27. The evaporation of refrigerant in the refrigerant spaces around the passages 23 extracts heat from the air flowing into the duct 3 so as to cool the air for cabin use.

The refrigerant compressor 29 is driven by an air turbine 45 which in turn is driven by air diverted to it from the duct connection 27 through a bypass duct 47. From the turbine 45 the air returns to the duct 3 through a return bypass duct 49. Air is forced to travel through the turbine by closing the duct 3 between the two bypass ducts. This is done by means of a valve 51 operated by a temperature responsive motor element 53—for example, a Sylphon bellows, which is arranged to respond to cabin temperature and is connected to the valve 51 through suitable linkage 55.

A rise in temperature of the air within the cabin above the level at which it is to be normally maintained results in expansion of the bellows 53 and movement of the valve 51 to its closed position, indicated in the drawing. The resultant bypassing of the air through the turbine 45 will produce a dual cooling effect. The air will first be cooled in its passage through the evaporator as the result of the operation of the compressor 29. It will be again cooled in its passage through the turbine 45 as the result of the work abstraction in the turbine, thus partially counteracting the heating effect produced in the supercharger 11. The turbine 45 load power is supplied by a slightly accelerated supercharger engine.

When conditions do not require cooling of the air prior to its entry into the cabin, the control 53 will move the valve 51 to an open position in which it permits the air to flow directly from the connecting duct 27 to the duct 3, bypassing the turbine 45 and thus eliminating the operation of the cooling system and the cooling effect of the turbine 45. Intermediate positions of the valve 51 will produce a cooling effect at a reduced rate.

The air discharged from the cabin through the outlet 7 is delivered through a duct 57 to a power recovery air turbine 59 which is coupled to the drive shaft of the supercharger 11 through a one way drive.

The system utilizes the heat of compression developed in the supercharger 11 for meeting moderate heating requirements. For additional heating requirements, the heating effect of the supercharger may be increased by loading the supercharger. This is done by restricting the air inlet 19 so as to add to the work done by the supercharger in passing the air therethrough. For this purpose, the inlet is provided with restricting shutters 61 which are controlled by a thermo-responsive control device 63 linked thereto by suitable linkage 65. For further heating requirements, an auxiliary combustion engine heater 67 is arranged in heat exchange relationship with the duct 3. The auxiliary heater 67 is intended to operate only under conditions of extremely cold ambient atmospheric temperature.

I claim as my invention:

1. In an air conditioning system, air pumping means, a duct for conveying air under pressure from said pumping means to an enclosure to be conditioned, power operated means for conditioning the air flowing in said duct, an air motor for driving said last means, and means including a temperature controlled valve mechanism for bypassing air from said duct through said air motor and back to said duct.

2. In an air conditioning system, air pumping means, a duct for conveying air under pressure from said pumping means, power operated means for conditioning the air flowing in said duct, an air motor for driving said last means, a valve in said duct, an inlet to said air motor communicating with said duct on the pressure side of said valve, and an outlet from said air motor communicating with said duct on the other side of said valve, whereby to bypass air through said air motor when said valve is closed.

3. In an air conditioning system for an enclosure in which a plenum pressure is to be maintained, a supercharger, a duct for conveying the supercharged air to said enclosure, means for cooling the air flowing to said duct, said means including a refrigerant compressor, a turbine for driving said compressor, and means for bypassing air from said duct to said turbine for operating the same.

4. In an air conditioning system for an enclosure in which a plenum pressure is to be maintained, a supercharger, a duct for conveying the supercharged air to said enclosure, means for cooling the air flowing to said duct, said means including a refrigerant compressor, a turbine for driving said compressor, a valve in said duct, an inlet to said turbine communicating with said duct on the pressure side of said valve, and an outlet from said turbine communicating with said duct on the other side of said valve, whereby to bypass air through said turbine when said valve is closed.

5. In an air conditioning system for an enclosure in which a plenum pressure is to be maintained, a supercharger, a duct for conveying the supercharged air to said enclosure, means for conditioning said air, an air motor for powering said conditioning means, a bypass for directing air from said duct through said air motor and back to said duct, a temperature responsive valve mechanism controlling the flow of air through said bypass, said enclosure having an outlet, and a pressure regulator for controlling the flow of air through said outlet.

6. In an air conditioning system for an enclosure in which a plenum pressure is to be maintained, a supercharger, a delivery duct for conveying the supercharged air to said enclosure, means for conditioning the air flowing through said duct, means driven by the air flowing through said duct for driving said conditioning means, an outlet from said enclosure, and a turbine driven by the air delivered from said outlet and constituting a part of the means for driving said supercharger.

7. In an air conditioning system for a pressurized cabin of an airplane carrying an internal combustion engine, a supercharger driven by said engine, a duct for conveying the supercharged air to said cabin, means for cooling the air flowing through said duct, said means including a refrigerant compressor, a turbine driven by the air flowing through said duct for driving said compressor, an outlet for air leaving said cabin, and a power recovery turbine driven by the air coming from said cabin and constituting an auxiliary source of power for said supercharger.

8. In an air conditioning system for a pressurized cabin of an airplane, a supercharger, a duct for conveying the supercharged air to said cabin, means for cooling the air flowing through said duct, said means including an evaporator and a condenser, a rammed air intake for said condenser, a refrigerant compressor adapted to withdraw refrigerant from said evaporator and deliver it in compressed condition to said condenser, and an air turbine for driving said compressor, said turbine being driven by the flow of air through said duct.

9. In an air conditioning system for a pressurized cabin of an airplane having an internal combustion engine, a supercharger driven by said engine, a duct for delivering the supercharged air to said cabin, a refrigerating system including an evaporator forming part of said duct, a condenser and means for circulating fluid between said evaporator and condenser including a refrigerant compressor, a rammed air intake for said condenser, and means for delivering the air from said condenser to said internal combustion engine in heat exchange relation therewith.

10. An air conditioning system as defined in claim 9, including a turbine driven by the flow of air through said duct, adapted to drive said compressor.

11. An air conditioning system for the pressurized cabin of an airplane, comprising a supercharger, a duct for delivering air from said supercharger to said cabin, a refrigerating circuit including an evaporator forming a part of said duct and a condenser; a rammed air intake arranged to pass air in heat exchange relation to said condenser, a compressor for withdrawing refrigerant from said condenser and delivering it under pressure to said evaporator, a turbine for driving said compressor, said turbine being driven by the flow of air through said duct, and a thermostatically controlled valve adapted, when closed, to force the air to flow through said turbine, and, when open, to permit the air to by-pass said turbine through said duct.

12. An air conditioning system as defined in claim 11, including an outlet for said cabin, a recovery air turbine driven by the air from said outlet and constituting a partial source of power for driving said supercharger, and an internal combustion engine constituting the main source of power for driving said supercharger, said engine being arranged in the path of the air from said rammed air inlet past said condenser.

13. In combination with a duct for delivering air under pressure into an aircraft cabin, means for cooling the air flowing through said duct comprising, a refrigerant compressor, a turbine for driving said compressor, means for bypassing air from said duct through said turbine and back to said duct, and a valve in said duct adapted, when closed, to force said air to follow said bypass path and, when open, to permit said air to bypass said turbine through said duct.

14. The combination defined in claim 13, including a thermostat, sensitive to the temperature of the air in said cabin adapted to move said valve toward closed position in response to rising temperatures in the cabin and to move said valve toward open position in response to lowering temperatures in said cabin.

15. In an air conditioning system for a pressurized airplane cabin, in combination with a duct adapted to deliver air into said cabin under pressure, means for cooling the air flowing through said duct comprising an evaporator forming a portion of said duct, a refrigerant compressor adapted to withdraw fluid from said evaporator, an air turbine for driving said compressor, and means for bypassing air from said duct through said turbine for driving the same.

16. An air conditioning system as defined in claim 15, including thermostatically controlled valve means adapted, in response to lowering temperatures in said cabin, to bypass the air through said duct around said turbine, and heating means associated with said duct for heating the air passing therethrough.

17. The method of conditioning air in an enclosure in which a plenum pressure is to be maintained, comprising introducing the air under pressure into the enclosure, bypassing a portion of the air thus being introduced, through a turbine which drives a refrigerant compressor of an air cooling system, and controlling the bypassing of the air through said turbine so as to control the operation of the air cooling system.

WALDEMAR F. MAYER.

REFERENCES CITED

The following references are of record in the file of this patent:

UNITED STATES PATENTS

| Number | Name | Date |
|---|---|---|
| Re. 22,272 | Price | Feb. 16, 1943 |
| 2,098,558 | Anderson | Nov. 9, 1937 |
| 2,175,469 | Kaufman | Oct. 10, 1939 |
| 2,297,495 | Pfau | Sept. 29, 1942 |
| 2,327,737 | Pendergast | Aug. 24, 1943 |
| 2,364,458 | McCollum | Dec. 5, 1944 |
| 2,391,838 | Kleinhans et al. | Dec. 25, 1945 |
| 2,412,110 | Williams, Jr. | Dec. 3, 1946 |